(12) United States Patent
Maass et al.

(10) Patent No.: US 8,527,168 B2
(45) Date of Patent: Sep. 3, 2013

(54) METHOD AND DEVICE FOR ASCERTAINING A ROTATIONAL SPEED PARAMETER FOR DETERMINING A SETPOINT TORQUE

(71) Applicant: Robert Bosch GmbH, Stuttgart (DE)

(72) Inventors: Alexander Maass, Ludwigsburg (DE); Christian Vienken, Vaihingen/Enz (DE); Manfred Hellmann, Hardthof (DE); Kai Moegle, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/673,167

(22) Filed: Nov. 9, 2012

(65) Prior Publication Data

US 2013/0116901 A1 May 9, 2013

(30) Foreign Application Priority Data

Nov. 9, 2011 (DE) .......................... 10 2011 085 980

(51) Int. Cl.
*G06F 19/00* (2011.01)
(52) U.S. Cl.
USPC .................. 701/61; 701/51; 701/69; 701/84; 701/85; 701/86; 318/139; 318/249; 318/432; 318/630; 180/65.6; 180/65.8; 180/197; 180/248; 192/3.3; 192/3.31; 192/21.5; 192/48.9; 192/58.4; 192/70.12; 192/70.14; 192/218; 475/88; 475/206; 185/9; 60/448; 477/169
(58) Field of Classification Search
USPC ....... 701/51, 61, 69, 84, 85, 86, 89; 318/139, 318/249, 432, 630; 180/65.6, 65.8, 197, 180/248, 630; 192/3.3, 3.31, 21.5, 48.9, 192/58.4, 70.12, 70.14, 218, 58.42; 475/88, 475/206; 74/335, 572.1; 185/9; 60/448; 477/169
See application file for complete search history.

(56) References Cited

U.S. PATENT DOCUMENTS

| | | | |
|---|---|---|---|
| 6,110,066 A * | 8/2000 | Nedungadi et al. ................ 475/5 |
| 8,219,272 B2 * | 7/2012 | Seel et al. ......................... 701/22 |
| 8,302,713 B2 * | 11/2012 | Huber et al. ............. 180/65.265 |
| 2009/0218151 A1 * | 9/2009 | Huber et al. ............. 180/65.265 |
| 2009/0305842 A1 * | 12/2009 | Seel et al. ......................... 477/3 |
| 2010/0019709 A1 * | 1/2010 | Le Neindre et al. ..... 318/400.23 |
| 2010/0106386 A1 * | 4/2010 | Krasznai et al. ................. 701/70 |
| 2010/0280695 A1 * | 11/2010 | Mulot et al. ..................... 701/22 |
| 2011/0230307 A1 * | 9/2011 | Seel ................................. 477/5 |

* cited by examiner

*Primary Examiner* — McDieunel Marc
(74) *Attorney, Agent, or Firm* — Michael Best & Friedrich LLP

(57) ABSTRACT

A method for ascertaining a rotational speed parameter for determining a setpoint torque for driving a drivetrain. The drivetrain comprises a first and at least one second drive assembly for driving a hybrid vehicle. The first drive assembly can be coupled to the drivetrain by means of a clutch. The second drive assembly is mechanically coupled to the drivetrain. When the hybrid vehicle is being driven by means of at least the first drive assembly, the rotational speed parameter corresponds to the value of a shaft rotational speed. When the hybrid vehicle is being driven only by means of the second drive assembly, the rotational speed parameter corresponds to the value of a determined rotational speed.

12 Claims, 2 Drawing Sheets

METHOD AND DEVICE FOR ASCERTAINING A ROTATIONAL SPEED PARAMETER FOR DETERMINING A SETPOINT TORQUE

BACKGROUND OF THE INVENTION

The present invention relates to a method for ascertaining a rotational speed parameter for determining a setpoint torque, to a device having means for ascertaining a rotational speed parameter for determining a setpoint torque, and to a drivetrain having a device having means for ascertaining a rotational speed parameter for determining a setpoint torque.

Methods for determining a setpoint torque for driving a drivetrain of a vehicle are known from the prior art. The propulsion torque or setpoint torque desired by the driver is ascertained from a characteristic map as a function of the accelerator pedal angle and a shaft rotational speed. Here, the shaft rotational speed corresponds to the rotational speed of the gearbox input shaft or for example the rotational speed of an internal combustion engine coupled thereto by means of a clutch.

Hybrid vehicles have multiple drive assemblies which individually or jointly generate the propulsion torque desired by a driver for accelerating the vehicle. The known method is also used in so-called parallel hybrid drive vehicles. In said topology of the drivetrain of the hybrid vehicle, both drive assemblies can be coupled to one another and are directly coupled to the gearbox input shaft. The rotational speed of the gearbox input shaft thus also corresponds to the rotational speed of the drive assemblies coupled thereto.

Hybrid vehicles exist which have drivetrain topologies in which the rotational speeds of the two drive assemblies are independent of one another. There is therefore no uniform rotational speed of both drive assemblies, such as is required for the known method for determining a setpoint torque.

SUMMARY OF THE INVENTION

Against this background, the invention provides an enhanced method for ascertaining a rotational speed parameter for determining a setpoint torque for driving a drivetrain. The drivetrain comprises a first and at least one second drive assembly for driving a hybrid vehicle. The first drive assembly can be coupled to the drivetrain by means of a clutch. This means in particular that the driveshaft of the first drive assembly, for example the crankshaft of an internal combustion engine, can be mechanically decoupled from and coupled to the drivetrain during operation of the hybrid vehicle. The second drive assembly is mechanically coupled to the drivetrain. This means in particular that the driveshaft of the second drive assembly, for example the rotor of an electric machine, cannot be mechanically decoupled from the drivetrain during operation of the hybrid vehicle. When the hybrid vehicle is being driven by means of at least the first drive assembly, the rotational speed parameter corresponds to the value of a shaft rotational speed. When the hybrid vehicle is being driven only by means of the second drive assembly, the rotational speed parameter corresponds to the value of a determined rotational speed.

The invention also provides a device which comprises means for ascertaining a rotational speed parameter for determining a setpoint torque for driving a drivetrain. The drivetrain comprises a first and at least one second drive assembly for driving a hybrid vehicle. The first drive assembly can be coupled to the drivetrain by means of a clutch. The second drivetrain is mechanically coupled to the drivetrain. When the hybrid vehicle is being driven by means of at least the first drive assembly, the rotational speed parameter corresponds to the value of a shaft rotational speed. When the hybrid vehicle is being driven only by means of the second drive assembly, the rotational speed parameter corresponds to the value of a determined rotational speed.

The invention finally provides a drivetrain which comprises means for ascertaining a rotational speed parameter for determining a setpoint torque for driving a drivetrain. The drivetrain comprises a first and at least one second drive assembly for driving a hybrid vehicle. The first drive assembly can be coupled to the drivetrain by means of a clutch. The second drivetrain is mechanically coupled to the drivetrain. The drivetrain comprises means for ascertaining a rotational speed parameter for determining a setpoint torque for driving the drivetrain. When the hybrid vehicle is being driven by means of at least the first drive assembly, the rotational speed parameter corresponds to the value of a shaft rotational speed. When the hybrid vehicle is being driven only by means of the second drive assembly, the rotational speed parameter corresponds to the value of a determined rotational speed.

Advantages Of the Invention

Through the use of the of the rotational speed parameter according to the invention for determining a setpoint torque for driving a drivetrain, the method known from the prior art for determining a setpoint torque for driving a drivetrain of a vehicle can also be used in hybrid vehicles whose drive assemblies do not have uniform rotational speeds during operation owing to the topology of the drivetrain.

In one embodiment of the invention, the first drive assembly is for example an internal combustion engine, and in particular the second drive assembly is an electric machine. Further drive assemblies or other types of drive assemblies, for example compressed air motors or hydraulic motors, may alternatively also be provided. In the case of said embodiment, when for example the internal combustion engine is coupled to the drivetrain by means of a closed clutch, the rotational speed of the internal combustion engine is advantageously used as a relevant variable as a rotational speed parameter in the method according to the invention. When the hybrid vehicle is being driven solely by means of the drive assembly coupled directly to the drivetrain, for example by means of the electric machine, a rotational speed is determined which is used as a rotational speed parameter in the method according to the invention.

In one embodiment of the invention, the first drive assembly can be coupled to at least one drive wheel by means of the clutch and a gearbox. The rotational speed to be determined is ascertained as a function of the present rotational speed of a drive wheel and a determined gearbox transmission ratio of the gearbox. In particular, the rotational speed to be determined is the result of the multiplication of the present rotational speed of the drive wheel and the determined gearbox transmission ratio.

The rotational speed to be determined is thus advantageously ascertained from physically measurable variables such as the rotational speed of a drive wheel and a gearbox transmission ratio to be determined. In particular, the rotational speed to be determined is, according to the invention, ascertained when the hybrid vehicle is being driven only by means of the second drive assembly.

In one embodiment of the invention, the gearbox transmission ratio to be determined is ascertained as a function of a mathematically calculated gearbox transmission ratio and the real mechanical gearbox transmission ratios of the gearbox. In particular, the gearbox transmission ratio to be determined corresponds to the real mechanical gearbox transmission ratios with the smallest difference in relation to the mathematically calculated gearbox transmission ratio.

A selection method is thus advantageously provided for the gearbox transmission ratio to be determined. As a gearbox, there may be provided for example a classic multi-gear manual gearbox, a double clutch gearbox, a continuously variable gearbox or a torque converter automatic gearbox.

In one embodiment of the invention, the mathematically calculated gearbox transmission ratio is ascertained by division of a starting rotational speed of the internal combustion engine, or internal combustion engine starting rotational speed, by the present rotational speed of a drive wheel. In particular, the internal combustion engine starting rotational speed is determined as a function of the engine temperature, the vehicle speed or the battery state or from a characteristic map.

A calculation and ascertaining method is thus provided for the mathematical calculation of a gearbox transmission ratio.

In one embodiment of the invention, when the hybrid vehicle is being driven by means of at least the first drive assembly, the clutch between the first drive assembly and the drivetrain is closed. In particular, when the hybrid vehicle is being driven only by means of the second drive assembly, the clutch between the first drive assembly and the drivetrain is open, that is to say in particular not closed.

The two different operating modes are advantageously thereby defined. In one operating mode, the rotational speed parameter corresponds to the value of the shaft rotational speed. The rotational speed parameter thus corresponds to the shaft rotational speed when the first drive assembly, in particular the internal combustion engine, is coupled to the drivetrain by means of the clutch. The rotational speed of the gearbox input shaft thus corresponds in particular to the rotational speed or the crankshaft rotational speed of the internal combustion engine. In the other operating mode, the rotational speed parameter corresponds to the value of the rotational speed to be determined. When the drive assembly is not coupled to the drivetrain by means of the clutch, the rotational speed of the internal combustion engine does not correspond to the gearbox input rotational speed of the drivetrain. In said case, the drivetrain can be driven only by the second drive assembly which is directly coupled thereto, in particular by the electric machine. The method known from the prior art for determining a setpoint torque for driving a drivetrain of a vehicle can thus also be used with the stated drivetrain topology, and independently of the present operating mode.

In one embodiment of the invention, to avoid step changes in the value of the rotational speed parameter during switching of the rotational speed parameter from the value of the shaft rotational speed to the determined rotational speed and vice versa, the gradient of the rotational speed parameter is limited. Said limitation is in particular dependent on the driving state of the vehicle. In particular, the limitation of the gradient of the rotational speed parameters is increased with decreasing rotational speed of the drive wheel. A high level of driving comfort is thus provided even during changes in operating mode.

In one embodiment of the invention, a drive wheel setpoint torque is ascertained as a function of the setpoint torque and a determined or limited determined gearbox transmission ratio. In particular, the drive wheel setpoint torque is for this purpose ascertained by multiplication of the setpoint torque and the determined or limited determined gearbox transmission ratio.

A calculation rule for the determination of the drive wheel setpoint torque is thus advantageously provided.

In one embodiment of the invention, when the hybrid vehicle is being driven by means of at least the first drive assembly, a determined substitute transmission ratio corresponds to the value of the present gearbox transmission ratio. In particular, when the hybrid vehicle is being driven only by means of the second drive assembly, the determined substitute transmission ratio corresponds to the value of the determined gearbox transmission ratio.

The two different operating modes in which the value of the substitute transmission ratio corresponds to the value of the present gearbox transmission ratio or to the value of the determined gearbox transmission ratio are advantageously thereby defined.

In one embodiment of the invention, to avoid step changes in the value of the substitute transmission ratio during switching of the substitute transmission ratio from the present gearbox transmission ratio to the determined gearbox transmission ratio and vice versa, the gradient of the substitute transmission ratio is limited. Said limitation is in particular dependent on the driving state of the vehicle. In particular, the limitation of the gradient of the determined substitute transmission ratio is increased with decreasing rotational speed of the drive wheel. A high degree of driving comfort is thus provided even during changes in operating mode.

It is self-evident that the features, characteristics and advantages of the method according to the invention correspondingly also apply to, or can be implemented in, the device according to the invention or the drivetrain.

Further features and advantages of embodiments of the invention will emerge from the following description with reference to the appended drawings.

BRIEF DESCRIPTION OF THE DRAWINGS

Identical and functionally identical elements, features and components are—unless stated otherwise—denoted in each case by the same reference symbols in the figures. It is self-evident that, for clarity, components and elements in the drawings are not necessarily illustrated true to scale.

Further possible embodiments and refinements and implementations of the invention also encompass combinations, which are not explicitly specified, of features of the invention described above or below.

DETAILED DESCRIPTION

Figure 1:
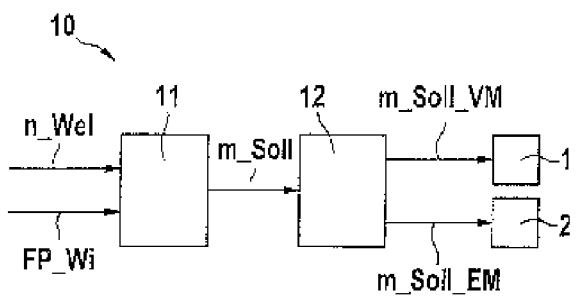
FIG. 1 shows, in schematic form, a method known from the prior art for determining a setpoint torque for driving a drivetrain of a hybrid vehicle.

FIG. 1 shows, in schematic form, a method 10 known from the prior art for determining a setpoint torque m_Soll for driving a drivetrain of a hybrid vehicle. In block 11, a setpoint torque m_Soll for driving a drivetrain of a hybrid vehicle is determined as a function of the accelerator pedal angle FP_Wi and a shaft rotational speed n_Wel. The accelerator pedal angle is read off from the accelerator pedal by means of a sensor and is supplied to the block 11. The shaft rotational speed is measured by means of a sensor and is supplied to the block 11. As the shaft rotational speed, use may be made of for example the rotational speed of the crankshaft of an internal combustion engine or a gearbox input rotational speed. The setpoint torque m_Soll is ascertained from the two input variables in block 11 by means of an algorithm or from a characteristic map. For a hybrid vehicle, in block 12, the setpoint torque m_Soll is subsequently divided into two components. The internal combustion engine 1 is driven with the component m_Soll_VM. The electric machine 2 is driven with the component m_Soll_EM.

Figure 2:
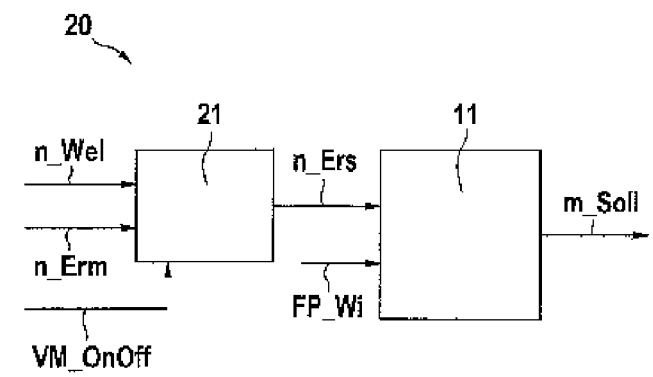
FIG. 2 shows, in schematic form, a method according to the invention for determining a setpoint torque for driving a drivetrain of a hybrid vehicle.

FIG. 2 shows, in schematic form, a method 20 according to the invention for determining a setpoint torque m_Soll for driving a drivetrain of a hybrid vehicle. For this purpose, in block 21, a selection as to whether the shaft rotational speed n_Wel or a determined rotational speed n_Erm is assigned to the rotational speed parameter n_Ers is made as a function of the present operating mode VM_OnOff of the hybrid vehicle. In the operating mode VM_OnOff in which the hybrid vehicle is driven by means of at least the first drive assembly, the rotational speed parameter n_Ers corresponds to the value of the shaft rotational speed n_Wel. In the operating mode VM_OnOff in which the hybrid vehicle is driven only by means of the second drive assembly, the rotational speed parameter n_Ers corresponds to the value of a determined rotational speed n_Erm. As described with regard to FIG. 1, in the subsequent block 11, a setpoint torque m_Soll for driving a drivetrain of a hybrid vehicle is determined as a function of the accelerator pedal angle FP_Wi and the rotational speed parameter n_Ers.

Figure 3:
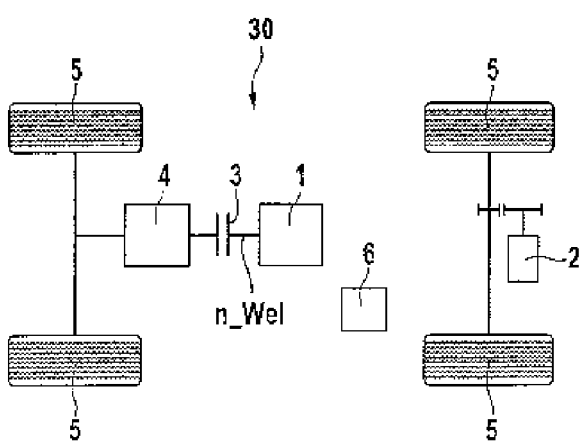
FIG. 3 shows, in schematic form, a drivetrain according to the invention having a front axle driven by an internal combustion engine and a rear axle driven by an electric motor.

FIG. 3 shows, in schematic form, a drivetrain 30 according to the invention having a front axle driven by an internal combustion engine and a rear axle driven by an electric motor. The crankshaft of the internal combustion engine 1 can be coupled to the drive wheels 5 via a clutch 3 and a gearbox 4. The shaft rotational speed n_Wel can be measured for example on the crankshaft. If insufficient electrical energy is available for driving the vehicle, the internal combustion engine is started, and mechanically connected to the rear axle by means of the clutch 3, in order to assist in driving the hybrid vehicle. The electric machine 2 is mechanically connected to the rear axle. When the electric machine 2 is operated as a motor, the electric machine drives the hybrid vehicle via the drive wheels 5. When the electric machine 2 is operated as a generator, electrical energy is generated which can be stored in an energy store (not illustrated). Also illustrated is a device 6, in particular a control unit, which can receive information from the individual components, and output information to said components for the control thereof, via suitable communication paths (not illustrated), for example electrical lines or radio. The method according to the invention may for example be executed by said device 6. Here, in the operating mode VM_OnOff in which the hybrid vehicle is driven by means of at least the first drive assembly, in particular by means of the internal combustion engine 1, the clutch 3 between the first drive assembly and the drivetrain is closed. In this case, the rotational speed of the gearbox input shaft corresponds to the rotational speed of the crankshaft of the internal combustion engine n_Wel. In the operating mode VM_OnOff in which the hybrid vehicle is driven only by means of the second drive assembly, in particular by means of the electric machine 2, the clutch 3 between the first drive assembly and the drivetrain is open.

Figure 4:
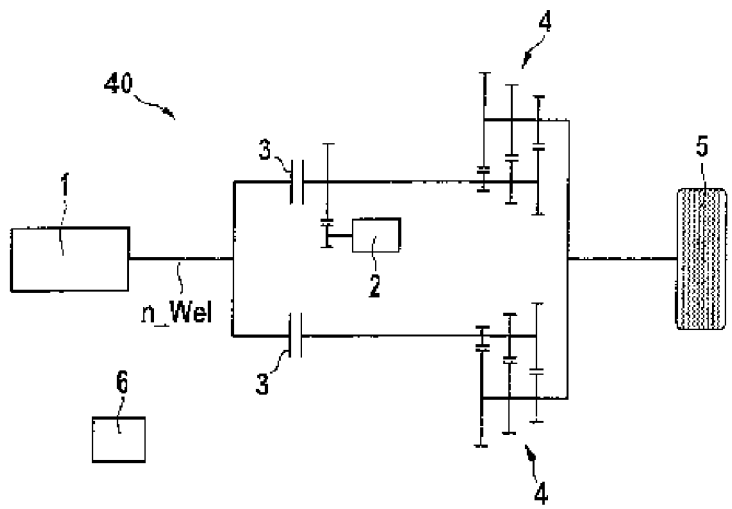
FIG. 4 shows, in schematic form, a drivetrain according to the invention having a double clutch gearbox and an electric machine coupled thereto.

FIG. 4 shows, in schematic form, a drivetrain 40 according to the invention having a double clutch gearbox and an electric machine 2 coupled thereto. The first drive assembly, in particular the crankshaft of an internal combustion engine 1, can be coupled by means of two clutches to in each case one of the two gearbox shafts of the double clutch gearbox 4, and thus to a drive wheel 5. The shaft rotational speed n_Wel may be measured for example on the crankshaft. If insufficient electrical energy for driving the vehicle is available, the internal combustion engine is started, and coupled to the drivetrain by means of one of the clutches 3, in order to assist in driving the hybrid vehicle. A simultaneous closure of both clutches 3 is prevented in order to prevent mechanical destruction of the gearbox. The electric machine 2 is mechanically connected to one of the two gearbox shafts. When the electric machine 2 is operated as a motor, the electric machine drives the hybrid vehicle via the drive wheel 5. When the electric machine 2 is operated as a generator, electrical energy is generated which can be stored in an energy store (not illustrated). Also illustrated is a device 6, in particular a control unit, which can receive information from the individual components, and output information to said components for the control thereof, via suitable communication paths (not illustrated), for example electrical lines or radio. The method according to the invention may for example be executed by said device 6. Here, in the operating mode VM_OnOff in which the hybrid vehicle is driven by means of at least the first drive assembly, in particular by means of the internal combustion engine 1, one of the clutches 3 between the first drive assembly and the drivetrain is closed. In this case, the rotational speed of the coupled gearbox input shaft corresponds to the rotational speed of the crankshaft of the internal combustion engine n_Wel. When the hybrid vehicle is being driven only by means of the second drive assembly, in particular during purely electric driving by means of the electric machine 2, the clutches 3 between the first drive assembly and the two gearbox shafts are open.

Figure 5:
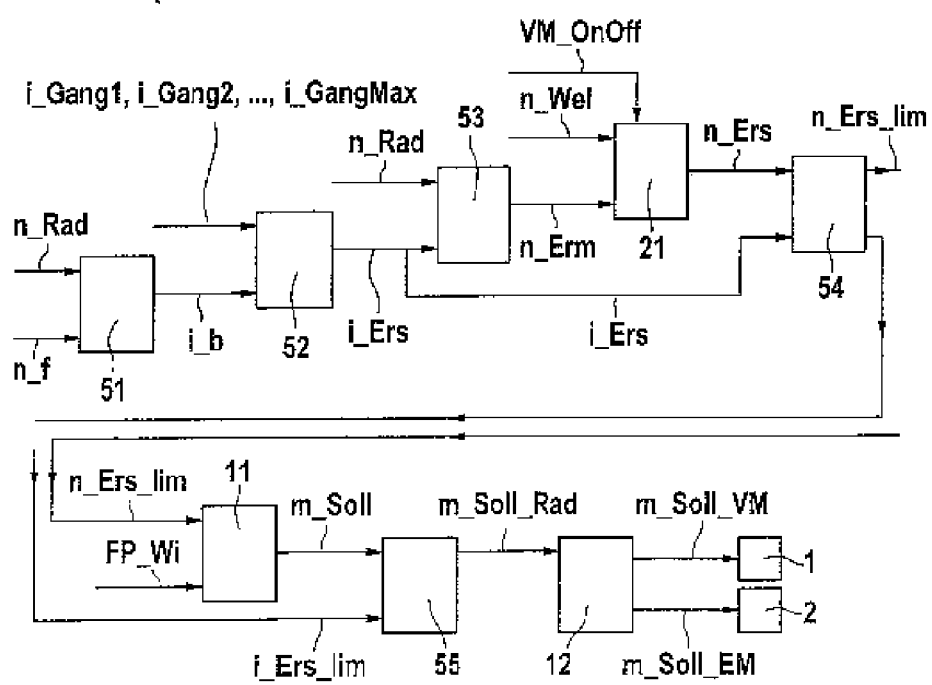
FIG. 5 shows, in schematic form, a further method according to the invention for determining a setpoint torque for driving a drivetrain of a hybrid vehicle.

FIG. 5 shows, in schematic form, a further method 50 according to the invention for determining a setpoint torque m_Soll for driving a drivetrain of a hybrid vehicle. In the block 51, the mathematically calculated gearbox transmission ratio i_b is ascertained as a function of the measured rotational speed n_Rad and the internal combustion engine starting rotational speed n_f, in particular by division of the internal combustion engine starting rotational speed n_f by the present rotational speed of a drive wheel n_Rad. In block 52, a gearbox transmission ratio i_Ers to be determined is ascertained as a function of the mathematically calculated gearbox transmission ratio i_b and the real mechanical gearbox transmission ratios i_Gang1, i_Gang2, . . . , i_GangMax of the gearbox. In block 53, the rotational speed n_Erm to be determined is ascertained as a function of the present rotational speed of a drive wheel n_Rad and a determined gearbox transmission ratio of the gearbox i_Ers. In particular, the rotational speed n_Erm to be determined is the result of the multiplication of the present rotational speed n_Rad of the drive wheel and the determined gearbox transmission ratio i_Ers. Furthermore, as described with regard to FIG. 2, in block 21, a selection as to whether the shaft rotational speed n_Wel or a determined rotational speed n_Erm is assigned to the rotational speed parameter n_Ers is made as a function of the present operating mode VM_OnOff of the hybrid vehicle. In block 54, the gradient of the rotational speed parameter n_Ers is limited in order to avoid step changes in the value of the rotational speed parameter during switching of the rotational speed parameter from the value of the shaft rotational speed to the determined rotational speed and vice versa. This yields the limited rotational speed parameter n_Ers_lim. As described with regard to FIG. 2, in the subsequent block 11, the setpoint torque m_Soll for driving a drivetrain of a hybrid vehicle is determined as a function of the accelerator pedal angle FP_Wi and the now limited rotational speed parameter n_Ers_lim. Furthermore, in block 54, the gradient of the determined gearbox transmission ratio of the gearbox i_Ers is also limited in order to avoid step changes in the value of the determined gearbox transmission ratio of the gearbox i_Ers during switching of the rotational speed parameter from the value of the shaft rotational speed to the determined rotational speed and vice versa. This yields the limited determined gearbox transmission ratio of the gearbox i_Ers_lim. In block 55, by multiplication of the setpoint torque m_Soll and the limited determined gearbox transmission ratio of the gearbox i_Ers_lim, the wheel setpoint torque m_Soll_Rad is calculated on the basis of the wheel torque acting on the drive wheel 5. As described with regard to FIG. 1, there follows a block 12. In said block, the drive wheel setpoint torque m_Soll_Rad is divided into components for the individual drive assemblies 1, 2, for example m_Soll_Rad_VM and m_Soll_Rad_EM. Furthermore, the components of the setpoint torques of the drive assemblies, for example m_Soll_VM and m_Soll_EM, are calculated by division of the components by the real transmission ratios presently effective between the drive wheels 5 and the drive assemblies 1, 2. The internal combustion engine 1 is driven with the component m_Soll_VM. The electric machine 2 is driven with the component m_Soll_EM.

The invention claimed is:

1. A method for ascertaining a rotational speed parameter for determining by a processor a setpoint torque for driving a drivetrain,
   wherein the drivetrain comprises a first and at least one second drive assembly for driving a hybrid vehicle,
   wherein the first drive assembly can be coupled to the drivetrain by means of a clutch and the second drive assembly is mechanically coupled to the drivetrain,
   wherein, when the hybrid vehicle is being driven by means of at least the first drive assembly, the rotational speed parameter corresponds to the value of a shaft rotational speed, and
   when the hybrid vehicle is being driven only by means of the second drive assembly, the rotational speed parameter corresponds to the value of a determined rotational speed.

2. The method according to claim 1, wherein
   the first drive assembly comprises an internal combustion engine, and the second drive assembly comprises an electric machine.

3. The method according to claim 1, wherein the first drive assembly can be coupled to at least one drive wheel by means of the clutch and a gearbox, and
   the determined rotational speed is ascertained as a function of the present rotational speed of a drive wheel and a determined gearbox transmission ratio of the gearbox.

4. The method according to claim 3, wherein
   the determined gearbox transmission ratio is ascertained as a function of a calculated gearbox transmission ratio and the mechanical gearbox transmission ratios of the gearbox.

5. The method according to claim 4, wherein the calculated gearbox transmission ratio is ascertained by division of an internal combustion engine starting rotational speed by the present rotational speed of the drive wheel.

6. The method according to claim 1, wherein,
   when the hybrid vehicle is being driven by means of at least the first drive assembly, the clutch between the first drive assembly and the drivetrain is closed, and, when the hybrid vehicle is being driven only by means of the second drive assembly, the clutch between the first drive assembly and the drivetrain is open.

7. The method according to claim 1, wherein,
   to avoid step changes in the value of the rotational speed parameter during switching of the rotational speed parameter from the value of the shaft rotational speed to the determined rotational speed and vice versa, the gradient of the rotational speed parameter is limited.

8. The method according to claim 1, wherein
   a drive wheel setpoint torque is ascertained as a function of a setpoint torque and a determined or limited determined gearbox transmission ratio.

9. The method according to claim 8, wherein,
   when the hybrid vehicle is being driven by means of at least the first drive assembly, the determined substitute transmission ratio corresponds to the value of the present gearbox transmission ratio, and,
   when the hybrid vehicle is being driven only by means of the second drive assembly, the determined substitute transmission ratio corresponds to the value of the determined gearbox transmission ratio.

10. The method according to claim 9, wherein,
    to avoid step changes in the value of the limited substitute transmission ratio during switching of the dynamically limited substitute transmission ratio from the present gearbox transmission ratio to the determined gearbox transmission ratio and vice versa, the gradient of the substitute transmission ratio is limited.

11. A device having means for ascertaining a rotational speed parameter for determining a setpoint torque for driving a drivetrain,
    wherein the drivetrain comprises a first and at least one second drive assembly for driving a hybrid vehicle,
    wherein the first drive assembly can be coupled to the drivetrain by means of a clutch and the second drive assembly is mechanically coupled to the drivetrain,
    wherein, when the hybrid vehicle is being driven by means of at least the first drive assembly, the rotational speed parameter corresponds to the value of a shaft rotational speed, wherein,
    when the hybrid vehicle is being driven only by means of the second drive assembly, the rotational speed parameter corresponds to the value of a determined rotational speed.

12. A drivetrain comprising:
    a first and at least one second drive assembly for driving a hybrid vehicle, wherein the first drive assembly can be coupled to the drivetrain by means of a clutch and the second drive assembly is mechanically coupled to the drivetrain,
    means for ascertaining a rotational speed parameter for determining a setpoint torque for driving the drivetrain,
    wherein, when the hybrid vehicle is being driven by means of at least the first drive assembly, the rotational speed parameter corresponds to the value of a shaft rotational speed,
    wherein,
    when the hybrid vehicle is being driven only by means of the second drive assembly, the rotational speed parameter corresponds to the value of a determined rotational speed.

* * * * *